(12) United States Patent
Zhang et al.

(10) Patent No.: US 11,671,314 B2
(45) Date of Patent: Jun. 6, 2023

(54) CONFIGURING HCI MANAGEMENT NETWORK VIA MANAGEMENT CONTROLLER

(71) Applicant: Dell Products L.P., Round Rock, TX (US)

(72) Inventors: Tianming Zhang, Hopkinton, MA (US); Jason Jianxin Ye, Shanghai (CN); Zhenyu Qi, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 134 days.

(21) Appl. No.: 16/898,885

(22) Filed: Jun. 11, 2020

(65) Prior Publication Data

US 2021/0392038 A1 Dec. 16, 2021

(51) Int. Cl.
*H04L 41/0806* (2022.01)
*H04L 43/10* (2022.01)
*H04L 67/10* (2022.01)
*G06F 9/54* (2006.01)
*G06F 9/455* (2018.01)
*G06F 9/4401* (2018.01)

(52) U.S. Cl.
CPC ........ *H04L 41/0806* (2013.01); *G06F 9/4401* (2013.01); *G06F 9/45558* (2013.01); *G06F 9/547* (2013.01); *H04L 43/10* (2013.01); *H04L 67/10* (2013.01); *G06F 2009/45595* (2013.01)

(58) Field of Classification Search
CPC ..... H04L 41/0806; H04L 67/10; H04L 43/10; H04L 41/08; H04L 41/344; H04L 41/0886; H04L 67/025; H04L 67/52; H04L 67/1097; G06F 9/4401; G06F 9/45558; G06F 9/547; G06F 2009/45595; G06F 8/60; G06F 21/57; G06F 9/46; G06F 9/54; G06F 9/455; G06F 9/5083
USPC ........................................................ 709/224
See application file for complete search history.

(56) References Cited

U.S. PATENT DOCUMENTS

| | | | | |
|---|---|---|---|---|
| 9,641,547 | B2* | 5/2017 | Yampolskiy | G06Q 10/0635 |
| 9,794,275 | B1* | 10/2017 | Benameur | H04L 63/1458 |
| 10,521,195 | B1* | 12/2019 | Swope | G06F 8/20 |
| 11,516,253 | B1* | 11/2022 | Van Deman, V | H04L 63/10 |
| 2004/0205136 | A1* | 10/2004 | Whittenberger | G06Q 10/10 709/206 |

(Continued)

*Primary Examiner* — James N Fiorillo
(74) *Attorney, Agent, or Firm* — Jackson Walker L.L.P.

(57) ABSTRACT

An information handling system may include a host system including a host network interface; and a management controller including a management network interface, the management controller being configured to provide out-of-band management of the information handling system. The management controller may be configured to: receive, via the management network interface, network configuration information for the host network interface; and provide access to the network configuration information via an application programming interface (API). The host system may be configured to: poll the API of the management controller at selected times until the management controller provides access to the network configuration information; retrieve the network configuration information via the API; and configure the host network interface in accordance with the network configuration information.

16 Claims, 2 Drawing Sheets

(56) References Cited

U.S. PATENT DOCUMENTS

| | | | |
|---|---|---|---|
| 2007/0033419 A1* | 2/2007 | Kocher | G11B 20/00086 |
| | | | 713/193 |
| 2009/0077277 A1* | 3/2009 | Vidal | G06F 1/3203 |
| | | | 710/46 |
| 2010/0064102 A1* | 3/2010 | Brown | H04L 67/1097 |
| | | | 711/114 |
| 2011/0138053 A1* | 6/2011 | Khan | H04L 67/1002 |
| | | | 709/226 |
| 2014/0181248 A1* | 6/2014 | Deutsch | H04L 61/4511 |
| | | | 709/217 |
| 2015/0074250 A1* | 3/2015 | Chang | H04L 41/0659 |
| | | | 709/221 |
| 2016/0142283 A1* | 5/2016 | Bennett | H04L 67/10 |
| | | | 709/223 |
| 2016/0283221 A1* | 9/2016 | Kochar | G06F 8/654 |
| 2018/0129975 A1* | 5/2018 | Razin | G06N 20/00 |
| 2018/0241642 A1* | 8/2018 | Patel | G06F 9/45533 |
| 2019/0028345 A1* | 1/2019 | Kommula | H04L 41/40 |
| 2019/0028382 A1* | 1/2019 | Kommula | H04L 45/125 |
| 2019/0042321 A1* | 2/2019 | Venkatesh | G06F 9/45558 |
| 2019/0212998 A1* | 7/2019 | Vallala | G06F 8/60 |
| 2019/0324820 A1* | 10/2019 | Krishnan | G06F 9/5088 |
| 2019/0327144 A1* | 10/2019 | Tembey | G06F 9/45558 |
| 2019/0342162 A1* | 11/2019 | Bendre | H04L 67/55 |
| 2020/0004570 A1* | 1/2020 | Glade | G06F 9/5077 |
| 2020/0067876 A1* | 2/2020 | Sireling | H04L 61/5061 |
| 2020/0151024 A1* | 5/2020 | Ji | G06F 9/546 |
| 2020/0167175 A1* | 5/2020 | Tsirkin | H04L 61/2514 |
| 2020/0201666 A1* | 6/2020 | Aron | H04L 67/53 |
| 2020/0218561 A1* | 7/2020 | Lal | H04L 67/1008 |
| 2020/0333977 A1* | 10/2020 | Shah | G06F 3/0653 |
| 2021/0144232 A1* | 5/2021 | Ramalingam | H04L 41/5048 |
| 2021/0201386 A1* | 7/2021 | Hsu | G06F 16/9538 |
| 2021/0234865 A1* | 7/2021 | Rose | H04L 63/1416 |

\* cited by examiner

CONFIGURING HCI MANAGEMENT NETWORK VIA MANAGEMENT CONTROLLER

TECHNICAL FIELD

The present disclosure relates in general to information handling systems, and more particularly to the initial configuration of information handling systems such as server information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system).

HCI cluster installation typically requires a customer or service engineer to be physically close to the cluster. This is particularly the case at the beginning of the installation, when the factory link local IP setting of the cluster element manager can typically be accessed only via a Top-of-the-Rack (TOR) switch. For enterprise customers that need to install tens or hundreds of clusters, it is much preferred to be able to automate the installations from a central data center. If the clusters are located in separate geographical locations (e.g., remote/branch offices), it is not always possible or may be cost prohibitive to have someone knowledgeable to be physically nearby during the installation.

Existing solutions generally fall into three categories:
1. Installation of the HCI cluster is done locally.
2. Someone is sent to the physical location of the cluster to set up the HCI manager network by connecting to it via a locally connected laptop, after which the remainder of the installation can be done remotely.
3. Local personnel may set up a jump host, which has two network interfaces that connect to the local factory default private subnet from the HCI manager (e.g., VxRail Manager) and the company network. The remainder of the installation can then be done remotely by logging into the jump host and getting access to the HCI manager through the other network interface to initiate the installation.

All three of these options require the presence of local personnel to assist with or perform the installation, which does not scale well with clusters situated in scattered geographical locations.

Accordingly, embodiments of this disclosure may allow for remote configuration without the need for an engineer to be physically present.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with the configuration of server information handling systems may be reduced or eliminated.

In accordance with embodiments of the present disclosure, an information handling system may include a host system including a host network interface; and a management controller including a management network interface, the management controller being configured to provide out-of-band management of the information handling system. The management controller may be configured to: receive, via the management network interface, network configuration information for the host network interface; and provide access to the network configuration information via an application programming interface (API). The host system may be configured to: poll the API of the management controller at selected times until the management controller provides access to the network configuration information; retrieve the network configuration information via the API; and configure the host network interface in accordance with the network configuration information.

In accordance with these and other embodiments of the present disclosure, a method may include a management controller configured to provide out-of-band management of an information handling system receiving, via a management network interface, network configuration information for a host network interface of a host system of the information handling system; the management controller providing access to the network configuration information via an application programming interface (API); the host system polling the API of the management controller at selected times until the management controller provides access to the network configuration information; the host system retrieving the network configuration information via the API; and the host system configuring the host network interface in accordance with the network configuration information.

In accordance with these and other embodiments of the present disclosure, an article of manufacture may include a non-transitory, computer-readable medium having computer-executable code thereon that is executable by a management controller of an information handling system for: receiving, via a management network interface, network configuration information for a host network interface of a host system of the information handling system; and providing access to the network configuration information via an application programming interface (API); wherein the host system is configured to: poll the API of the management controller at selected times until the management controller provides access to the network configuration information; retrieve the network configuration information via the API; and configure the host network interface in accordance with the network configuration information.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
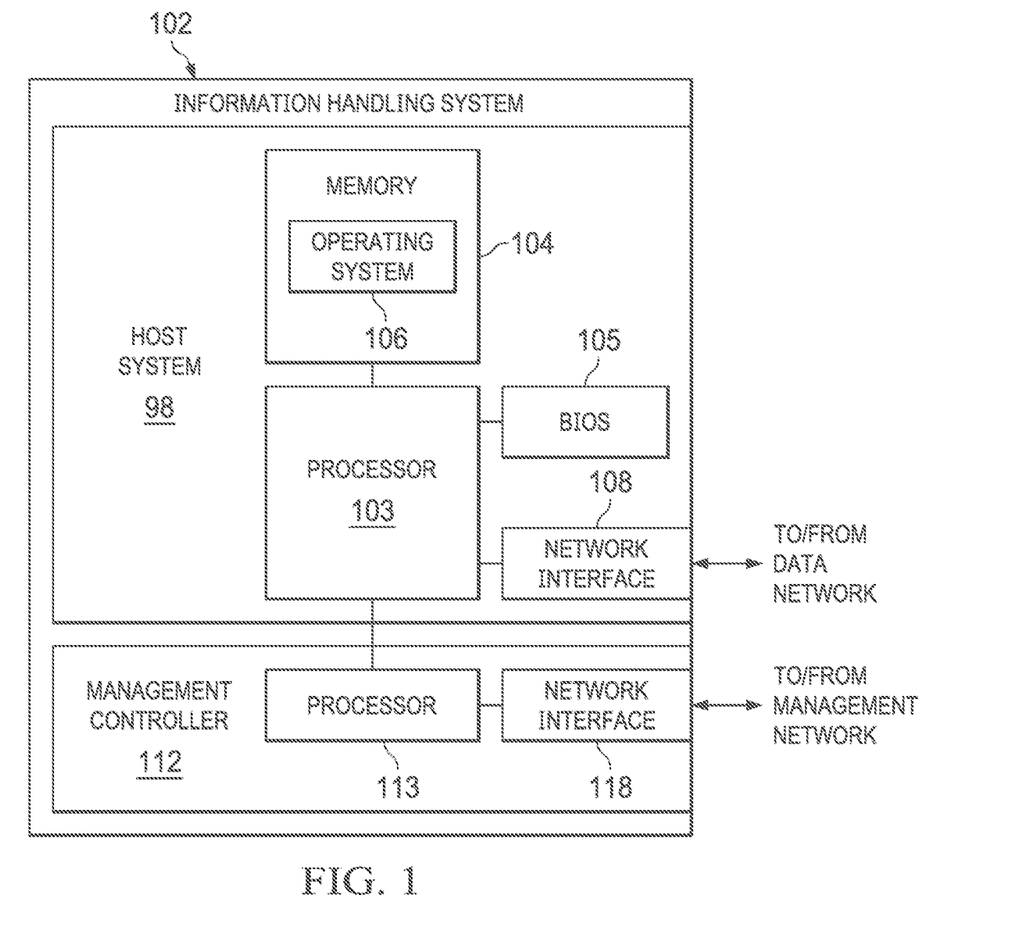
FIG. 1 illustrates a block diagram of an example information handling system, in accordance with embodiments of the present disclosure.
Figure 2:
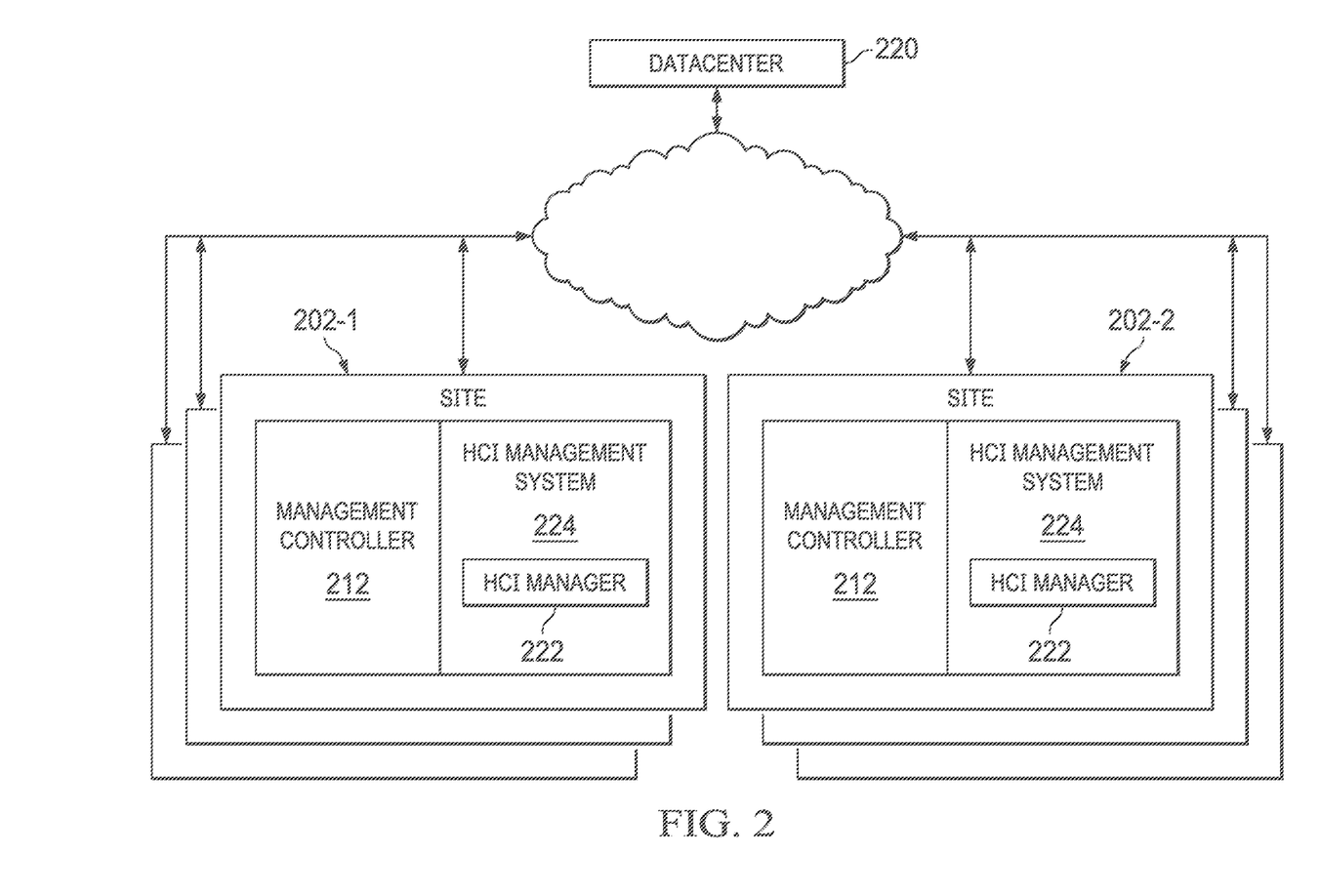
FIG. 2 illustrates a block diagram of example information handling systems, in accordance with embodiments of the present disclosure.

Preferred embodiments and their advantages are best understood by reference to FIGS. 1 and 2, wherein like numbers are used to indicate like and corresponding parts. For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time.

Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., a network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102 (e.g., by a user operating a management console). Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure may allow for remote configuration of an information handling system such as information handling system 102.

Typically, management controller 112 may have a network configuration (e.g., an IP address) set up when the hardware components of information handling system 102 are unboxed, racked, stacked, and powered up. Accordingly, management controller 112 may be externally accessible, and an API of management controller 112 may be leveraged to set up an HCI manager network (e.g., the management network discussed above, such as a VxRail manager network) remotely.

Once the HCI manager network is set up, the cluster installation can be automated from a remote location. As management controller 112 typically does not communicate with the host or the HCI manager (e.g., an HCI manager such as a VxRail Manager, which may for example run as a virtual machine (VM) within the cluster) directly, the solution may also include the HCI manager exchanging IP networking information and IP configuration status with management controller 112 via an accessible attribute of management controller 112. For example, such an attribute may be in accordance with an application programming interface (API) of management controller 112, such as a LifeCycleController API. As discussed herein, such attributes will be referred to as LC Attributes. One of ordinary skill in the art with the benefit of this disclosure will understand its applicability to other API attributes of other types of management controller as well.

With reference to FIG. 2, in accordance with some embodiments of this disclosure, a method as described below may be used to configure an HCI manager IP address and/or other network parameters.

From a remote datacenter 220, a user may execute a provided script to call an API of management controller 212 at site 202-1 or site 202-2 (or in general, any site of a plurality of sites 202-n). This is possible because, as discussed above, management controller 212 may have a network configuration (e.g., an IP address) set up when the hardware components of an information handling system including management controller 212 are set up. Accordingly, management controller 112 may be externally accessible from datacenter 220.

The script executed from datacenter 220 may pass to management controller 212 an IP address of the HCI manager 222 of HCI management system 224, as well as a netmask, a gateway, and vLAN information. After management controller 212 receives such information, it may be accessible via an API. HCI manager 222 may periodically poll the IP address LCAttributes (e.g., based on the LifeCycleController API of management controller 212) to check if valid encoded network information is found. Once a valid set of information is read, the HCI manager 222 may configure its own network address accordingly. For example, in some embodiments, the HCI manager 222 may poll the data via the hosts (e.g., hosts such as HCI management systems 224) by using an IPv6 link-local address. In some instances, management controller 212 may be in a separate subnet that may not be accessible (or its IP address may not be known to the HCI manager 222).

However, HCI manager 222 and HCI management system 224 should typically be visible to each other. Additionally, HCI management system 224 (e.g., an ESXi™ host) can access certain attributes from a management controller 212 residing in the same chassis.

After the network address of HCI manager 222 is configured correctly, HCI manager 222 may write back an encoded success status code to the same LCAttribute property of management controller 212.

If any misconfiguration (e.g. mismatched settings from multiple management controllers 212 in the cluster) occurs, then a special encoded error status code may instead be written back to the LCAttribute property at management controller 212.

The user at datacenter 220 can execute another provided script to check the status to wait for the success status to be returned. In case of error, the user can try again by resetting the network configuration information.

Additionally or alternatively, the user can ping the passed-in network address in the proper subnet periodically until the ping returns successfully.

In accordance with these and other embodiments of this disclosure, another method as described below may be used to allow a user to set up an IP configuration via an attribute of a management controller.

The HCI management system 224 may provide a script to encode user input, call an API of management controller 212, and store the user input in an attribute of management controller 212. For example, an attribute such as LifecycleController.LCAttributes.VirtualAddressManagementApplication may be used in some embodiments. The user may call the provided script with the IP address, mask, gateway, and vLAN. A possible format for the stored IP network information in the LCAttributes property is shown below at Table 1.

TABLE 1

| LifecycleController.LCAttributes.VirtualAddressManagementApplication | | | | | | |
|---|---|---|---|---|---|---|
| | Bytes | | | | | |
| Description | 0-7 | 8-15 | 16-17 | 18-21 | 22-23 | 24-31 |
| Definition | IP address | Gateway | Mask | vLAN | Status | N/A |

One of ordinary skill in the art with the benefit of this disclosure will understand that various other encodings for this property or a related property may be used in any particular embodiment.

In accordance with these and other embodiments of this disclosure, another method as described below may be used to allow the HCI manager to return a status of the operation.

The HCI management system 224 may provide a script to read the status from the LC Attribute as shown above in Table 1. (For example, HCI management system 224 may have a public IP address that is accessible from the remote datacenter 220.) The HCI manager 222 may read the LC Attribute and configure its network interface. Once configuration has completed successfully, the HCI manager 222 may update the LC Attribute (e.g., with a status of 0) to indicate success. The user may call the status script of HCI management system 224 to get the status.

In accordance with these and other embodiments of this disclosure, another method as described below may be used to allow multiple LC Attributes of a management controller to be set.

For example, in some cases, a user may accidentally set different IP configuration information on management controllers 212 of more than one host (e.g., by calling a script provided by the HCI management system as discussed above). In order to prevent this from causing issues, HCI manager 222 may read the LC Attribute from management controller 212 on all the hosts in the cluster. If different IP configurations are detected, no configuration will be done, and the proper error code may be written back to the LC Attribute status byte on all of the impacted management controllers 212.

The user may then get the related error messages by calling the status script discussed above. The user may then update the management controllers 212 with the correct configuration information by the network configuration script discussed above. Additionally or alternatively, the user can clean up the incorrect LC Attribute values by calling the API directly on one or more management controllers 212. After the corrections have been made, the HCI manager 222 may detect consistent LC Attribute values from all of the management controllers 212 of the hosts in the cluster. The HCI manager 222 may then proceed with network configuration and mark the LC Attribute status as success.

Accordingly, embodiments of this disclosure may provide several advantages. For example, a mechanism to allow a user to remotely configure network settings of the HCI manager (e.g., an HCI manager VM) via APIs of the management controller (e.g., LifeCycleController APIs) has heretofore not been available. The settings may include IP, mask, gateway, vLAN information, etc.

Further, a mechanism for the HCI manager to detect changes to attributes of the management controllers (e.g., the LCAttributes.IPAddress field, etc.) has also not heretofore been available.

Further, a mechanism for the HCI manager to validate attributes of the management controllers (e.g., the format of the LCAttributes.IPAddress field, etc.) and configure its network settings based on the field content has also not heretofore been available.

Further, the ability to allow an HCI manager to pass back IP configuration status to a management controller (e.g., via an LCAttributes.IPAddress field) has also not heretofore been available.

Further, the ability for a user to query a management controller for the HCI manager network configuration status has also not heretofore been available.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
    a host system including a host network interface coupled to a data network; and
    a management controller including a management network interface coupled to an out-of-band management network separate from the data network, the management controller being configured to provide out-of-band management of the information handling system;
    wherein the management controller is further configured to:
    receive, via the out-of-band management network and the management network interface, network configuration information for the host network interface, wherein the network configuration information includes an internet protocol (IP) address usable by the host network interface on the data network; and
    provide access to the network configuration information via an application programming interface (APJ); and
    wherein the host system is configured to:
    poll the API of the management controller at selected times until the management controller provides access to the network configuration information;
    retrieve the network configuration information via the API;
    configure the host network interface in accordance with the network configuration information, wherein configuring the host network interface includes making the host system accessible on the data network via the IP address; and
    write a status code to the management controller via the API indicating success or failure of the configuration of the host network interface, wherein the management controller is configured to provide access to the status code via the management network interface;
    wherein in response to the status code indicating failure, a script is configured to enable changes to one or more attributes included in the network configuration information based on updated network configuration information retrieved via the API.

2. The information handling system of claim 1, wherein the information handling system is an element of an information handling system cluster.

3. The information handling system of claim 2, wherein the information handling system cluster is a hyper-converged infrastructure (HCI) cluster.

4. The information handling system of claim 3, wherein an HCI manager executing on the host system is configured to carry out the polling, retrieving, and configuring.

5. The information handling system of claim 4, wherein the HCI manager is configured to execute as a virtual machine (VM) on the host system.

6. The information handling system of claim 1, wherein the network configuration information further includes at least one setting selected from the group consisting of a netmask, a gateway, and a VLAN configuration.

7. A method comprising:
    a management controller configured to provide out-of-band management of an information handling system receiving, via a management network interface coupled to an out-of-band management network, network configuration information for a host network interface of a host system of the information handling system,
    wherein the host network interface is coupled to a data network separate from the out-of-band management network, and wherein the network configuration information includes an internet protocol (IP) address usable by the host network interface on the data network;
    the management controller providing access to the network configuration information via an application programming interface (API);
    the host system polling the API of the management controller at selected times until the management controller provides access to the network configuration information;
    the host system retrieving the network configuration information via the API;
    the host system configuring the host network interface in accordance with the network configuration information, wherein configuring the host network interface includes making the host system accessible on the data network via the IP address; and
    the host system writing a status code to the management controller via the API indicating success or failure of the configuration of the host network interface, wherein the management controller is configured to provide access to the status code via the management network interface;
    wherein in response to the status code indicating failure, a script is configured to enable changes to one or more attributes included in the network configuration information based on updated network configuration information retrieved via the API.

8. The method of claim 7, wherein the management controller is a baseboard management controller (BMC).

9. The method of claim 7, wherein the polling is carried out periodically.

10. The method of claim 7, wherein the network configuration information further includes at least one setting selected from the group consisting of a netmask, a gateway, and a vLAN configuration.

11. An article of manufacture comprising a non-transitory, computer-readable medium having computer-executable code thereon that is executable by a management controller of an information handling system for:
    receiving, via a management network interface coupled to an out-of-band management network, network configuration information for a host network interface of a host system of the information handling system, wherein the host network interface is coupled to a data network separate from the out-of-band management network, and wherein the network configuration information includes an internet protocol (IP) address usable by the host network interface on the data network; and providing access to the network configuration information via an application programming interface (APJ);

wherein the host system is configured to:

poll the API of the management controller at selected times until the management controller provides access to the network configuration information;

retrieve the network configuration information via the API;

configure the host network interface in accordance with the network configuration information, wherein configuring the host network interface includes making the host system accessible on the data network via the IP address; and write a status code to the management controller via the API indicating success or failure of the configuration of the host network interface, wherein the management controller is configured to provide access to the status code via the management network interface;

wherein in response to the status code indicating failure, a script is configured to enable changes to one or more attributes included in the network configuration information based on updated network configuration information retrieved via the API.

12. The article of claim 11, wherein the information handling system is an element of an information handling system cluster.

13. The article of claim 12, wherein the information handling system cluster is a hyper-converged infrastructure (HCI) cluster.

14. The article of claim 13, wherein an HCI manager executing on the host system is configured to carry out the polling, retrieving, and configuring.

15. The article of claim 14, wherein the HCI manager is configured to execute as a virtual machine (VM) on the host system.

16. The article of claim 11, wherein the network configuration information further includes at least one setting selected from the group consisting of a netmask, a gateway, and a vLAN configuration.

* * * * *

UNITED STATES PATENT AND TRADEMARK OFFICE
CERTIFICATE OF CORRECTION

PATENT NO. : 11,671,314 B2
APPLICATION NO. : 16/898885
DATED : June 6, 2023
INVENTOR(S) : Zhang et al.

It is certified that error appears in the above-identified patent and that said Letters Patent is hereby corrected as shown below:

In the Claims

1. In Column 9, Line 43, Claim 1, delete "(APJ)" and insert -- (API) --, therefor.

2. In Column 10, Line 13, Claim 6, delete "VLAN" and insert -- vLAN --, therefor.

3. In Column 11, Line 7, Claim 11, delete "(APJ)" and insert -- (API) --, therefor.

Signed and Sealed this
Twenty-second Day of August, 2023

Katherine Kelly Vidal
*Director of the United States Patent and Trademark Office*